H. H. HAUGHT.
PACK HARNESS.
APPLICATION FILED DEC. 10, 1913.

1,114,472.

Patented Oct. 20, 1914.
2 SHEETS—SHEET 1.

WITNESSES

INVENTOR
Henry H. Haught
BY
ATTORNEYS

H. H. HAUGHT.
PACK HARNESS.
APPLICATION FILED DEC. 10, 1913.
1,114,472.
Patented Oct. 20, 1914.
2 SHEETS—SHEET 2.
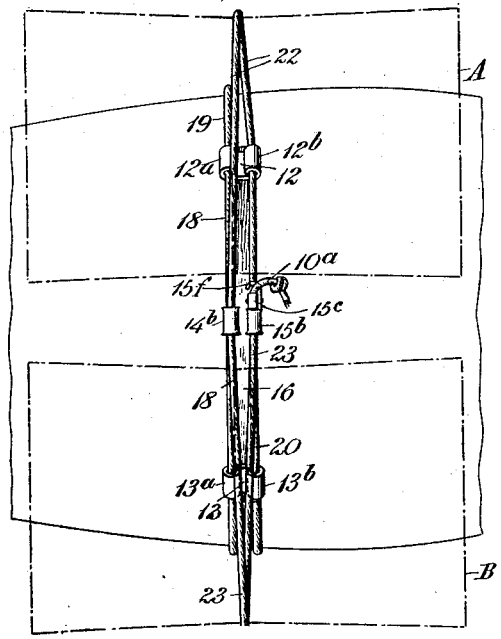
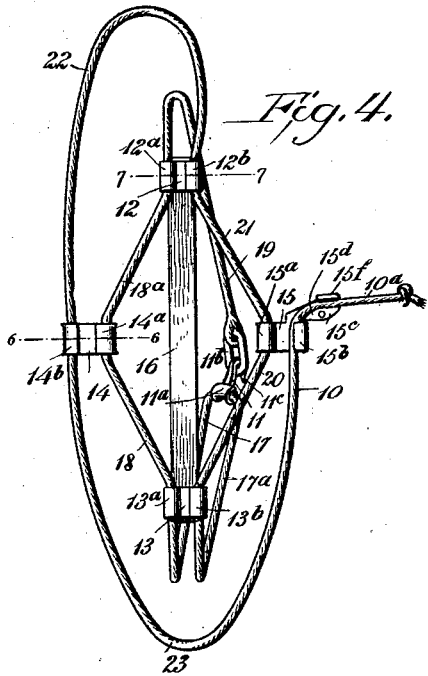
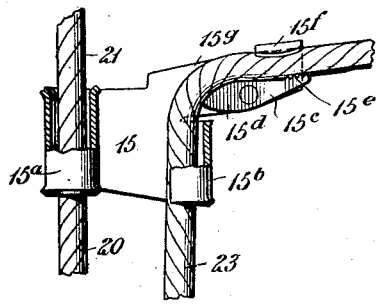
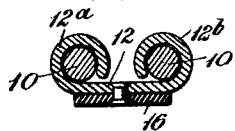
WITNESSES
INVENTOR
Henry H. Haught
BY
ATTORNEYS

UNITED STATES PATENT OFFICE.

HENRY H. HAUGHT, OF PAYSON, ARIZONA, ASSIGNOR OF ONE-HALF TO WILLIAM H. HILLIGASS, OF PAYSON, ARIZONA.

PACK-HARNESS.

1,114,472.  Specification of Letters Patent.  Patented Oct. 20, 1914.

Application filed December 10, 1913. Serial No. 805,835.

*To all whom it may concern:*

Be it known that I, HENRY H. HAUGHT, a citizen of the United States, and a resident of Payson, in the county of Gila and State of Arizona, have invented a new and Improved Pack-Harness, of which the following is a full, clear, and exact description.

My invention relates to a harness for securing packs on pack animals, and particularly to a novel pack harness formed of a single rope or equivalent flexible tying medium, which is formed into loops to embrace the right hand and left hand packs, and into detachably connected members forming what may be termed a bellyband united by coacting cinch elements, together with a saddle rig having right and left and front and back guide means with which the tie rope has running engagement, there being a catch to secure an end of the rope after the latter has been adjusted to tightly embrace the packs.

An object of the invention is to provide a pack harness which may be conveniently manipulated, and by means of which the packs will be properly held in place on the animal.

The invention will be particularly explained in the specific description following. Reference is to be had to the accompanying drawings forming a part of this specification, in which similar characters of reference indicate corresponding parts in all the views.

Figure 1:
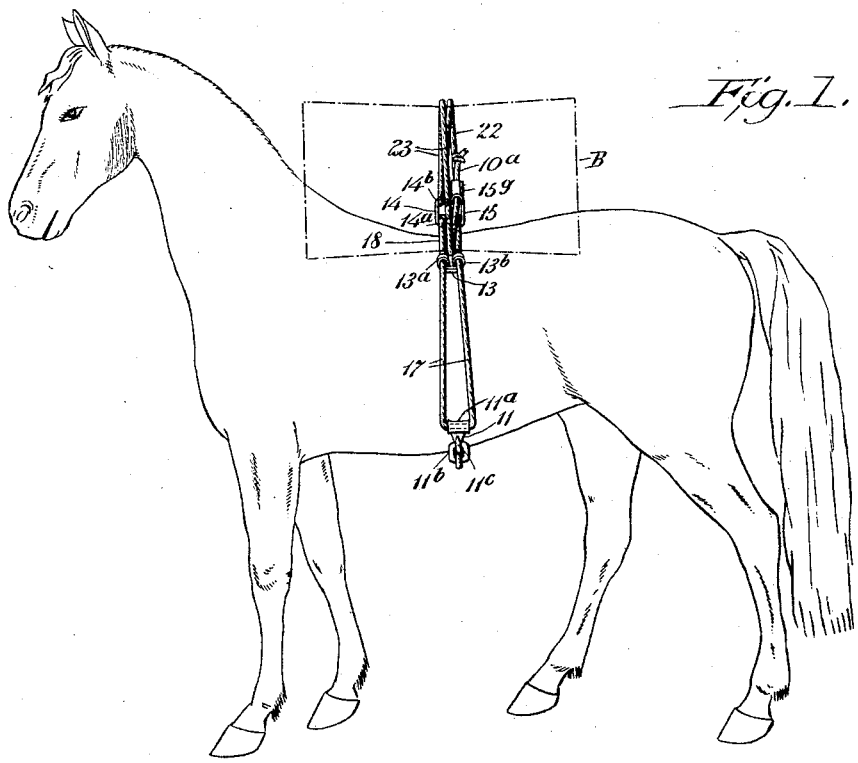
Figure 2:
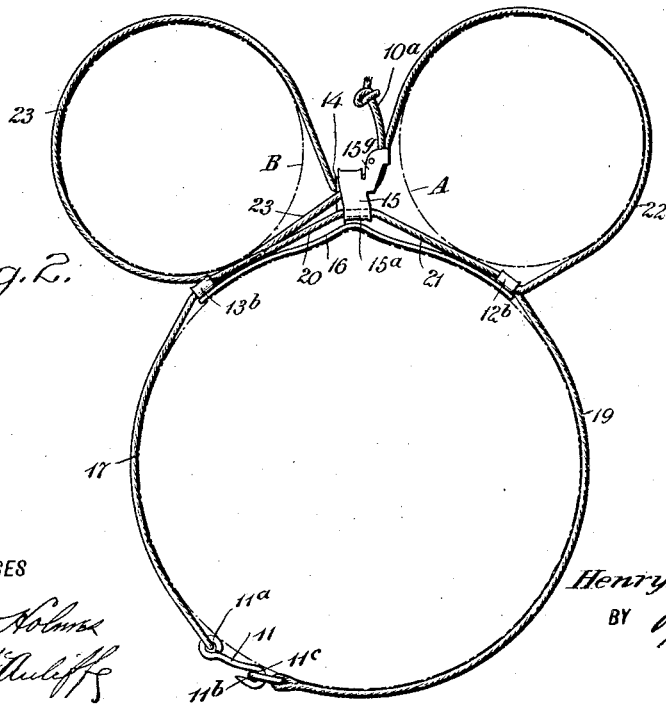

Figure 1 is a side elevation of a pack harness embodying the invention, showing the same applied; Fig. 2 is a rear view of the pack harness, on an enlarged scale; Fig. 3 is a plan view with the harness in position, the position of the harness relatively to the packs and the animal being indicated by the conventional representation of the latter; Fig. 4 is a plan view of the harness with the various features assembled and arranged approximately in the positions they will occupy when in use, and more or less arbitrarily displayed in the interest of clearness; Fig. 5 is an enlarged detail view, partly in section, of the back guide member and catch forming part of the saddle rig; Fig. 6 is a cross section on an enlarged scale, on the line 6—6 of Fig. 4; and Fig. 7 is a cross section on an enlarged scale on the line 7—7 of Fig. 4.

In carrying out the illustrated practical embodiment of my invention, a single stretch of rope, which is designated generally by the numeral 10, or other flexible tying medium is employed, and is given certain loops and bends as hereinafter explained, the rope being equipped with a cinch designated generally by the numeral 11, and a saddle rig including right hand and left hand guide elements 12, 13, a front guide element 14, and a back guide 15, equipped with a catch to grip an end of the rope. Preferably the right hand and left hand guide members 12, 13, are riveted or otherwise permanently fastened to a transverse saddle or strap section 16.

The rope 10 is doubled on itself, the rope at the bend having running engagement through an eye $11^a$ on the cinch 11. From the cinch both strands 17, $17^a$, extend upwardly at one side, preferably the left of the harness, and one of said strands (17) has running engagement through a front eye $13^a$ of the left hand guide 13, from which the rope has a stretch 18 to and through an eye $14^a$ on the front guide 14, the rope then running as at $18^a$ to the right hand guide member 12 and given a running engagement with said guide through a front eye $12^a$ thereon. From the eye $12^a$ the rope passes downward as at 19, and carries at its end a cinch ring $11^b$, or other equivalent element or formation adapted to engage the hook $11^c$ of the cinch 11. Tracing from the cinch 11 the other stretch ($17^a$) at the left of the harness, it will be observed, particularly from Fig. 4, that it extends through a rear eye $13^b$ on the left hand guide 13 of the saddle rig, thence as indicated at 20 to the back guide 15, and through a guide eye $15^a$ on the latter to run freely through the said eye. From the guide eye $15^a$ the rope extends, as at 21, to and through a rear guide $12^b$ on the right hand guide member 12, and is then formed into a loop 22 to embrace the right hand pack A, and under a hook $14^b$ on the front guide 14, from which point the rope is formed into a loop 23 embracing the left hand pack B, and under a hook 15ᵇ on the back guide 15, the free end 10ᵃ being held by a catch 15ᶜ.

The catch 15ᶜ is here shown as in the form of a toothed gripping lever, one arm 15ᵈ of which will be pressed upon by the rope as it passes from the final guide hook 15ᵇ to the toothed end 15ᵉ of the catch. The pressure of the rope on the arm 15ᵈ when the rope is drawn taut tends to press the toothed end 15ᵉ against the rope, pressing the latter against a flange 15ᶠ. The catch and flange are provided on a lateral arm 15ᵍ of the guide element 15.

In use, the cinch elements being separated by detaching the ring 11ᵇ from the hook 11ᶜ, the harness is thrown over the animal's back, the saddle rig resting on the back of the animal, with the strap 16 ranging transversely. The elements 17, 19, which constitute in effect a bellyband, are now brought together under the horse's barrel and the cinch elements connected by engaging the ring 11ᵇ with the hook 11ᶜ. The strand 17ᵃ of the left hand member of the bellyband is now tightened up, which will successively draw the members 17, 18, 18ᵃ and 19 taut; the proper pull is now exerted to make taut the members 20, 21, of the rope, and the latter is formed into the bend 23, and caused to embrace the right hand pack A, the said loop being tightened on the right hand pack by engaging the rope under the hook 14ᵇ of the forward guide. The packer now places the left hand pack B in position and forms the loop 23 around said pack, tightening up by engaging the rope under the hook 15ᵇ of the rear guide and running the same between the catch 15ᶜ and the flange 15ᶠ. It will be obvious that when the packer tightens up by a pull on the free end 10ᵃ, the rope will be automatically gripped by the catch 15ᶜ and held against retrograde movement.

Having thus described my invention, I claim as new and desire to secure by Letters Patent:

1. A pack harness comprising a flexible tying medium formed with separable bellyband sections, a cinch formed of co-acting elements on the respective sections, and a saddle rig having side guides formed each with a pair of guide eyes, and intermediate guides each having a guide eye and a guide hook, the tying medium having permament running engagement with the various guide eyes of all the guides and presenting a free end portion of a length to form right and left pack loops and adapted to detachably engage the guide hooks on the intermediate guides.

2. A pack harness, comprising a flexible tying medium in a single piece doubled on itself and formed into separable bellyband sections, one of which is a terminal of the tying medium, and the other of which is formed of the doubled portion presenting a bend, a cinch element on each of the bellyband sections, one of said elements having running engagement with the tying medium at the band, and a saddle ring comprising a plurality of guide elements with which the tying medium has running engagement, said tying medium extending from one of the bellyband sections transversely through certain of the guide elements to the opposite side and having a length to embrace right and left packs, there being an additional guide element to engage the said tying medium between the right and left packs, and a final guide element for the free end of the tying medium.

3. A pack harness, comprising a flexible tying medium, separable cinch members, and a saddle rig having side guide elements and front and back guide elements, one of the cinch members being on an end of the tying medium, the said medium being doubled on itself presenting bends having running engagement with the other cinch member, the tying medium extending from the respective cinch members in the form of bellyband sections, and from said sections transversely in opposite directions through guide elements of the saddle rig, the tying medium at one end presenting a free portion of a length to form right and left pack loops, and there being an additional guide member adapted to detachably engage the tying medium at an intermediate point between the pack loops and a further guide element for the terminal of the free portion.

4. A pack harness comprising a single piece of rope doubled on itself to present a bend and form one side section of a bellyband; a cinch element having running engagement with the rope at the bend; and a saddle rig having side guides and front and back guides, one stretch of the doubled rope extending permanently transversely through both side guides and an intermediate guide, and continued to form a second bellyband section, the latter having a cinch element adapted to detachably engage the cinch element at the bend of the rope; the second stretch of the doubled rope extending permanently transversely through both the said guides and an intermediate guide and presenting a free end portion of a length to form right and left pack loops, there being additional guide members on the front and back guides with which the said free end portion is adapted to have detachable engagement; the said rope having running engagement with the several guides.

5. A pack harness comprising a flexible tying medium formed with separable bellyband sections, a cinch formed of co-acting elements on the respective sections, and a saddle rig having side guides formed each with a pair of guide eyes, and intermediate guides each having a guide eye and a guide hook, the tying medium having permanent running engagement with the various guide eyes of all the guides presenting a free end portion of a length to form right and left pack loops and adapted to detachably engage the guide hooks on the intermediate guides, one of said intermediate guides having a fastening device for the terminal of the free end portion.

In testimony whereof I have signed my name to this specification in the presence of two subscribing witnesses.

HENRY H. HAUGHT.

Witnesses:
GEORGE A. RANDALL,
WILLIAM C. MCLACHLAN.

Copies of this patent may be obtained for five cents each, by addressing the "Commissioner of Patents, Washington, D. C."